United States Patent
Du et al.

(10) Patent No.: US 9,200,591 B2
(45) Date of Patent: Dec. 1, 2015

(54) AUTOMATIC IDENTIFICATION OF OPERATING PARAMETERS FOR POWER PLANTS

(75) Inventors: Yu Du, Shanghai (CN); Xiaoyan Zhang, Shanghai (CN)

(73) Assignee: Honeywell International Inc., Morristown, NJ (US)

( * ) Notice: Subject to any disclaimer, the term of this patent is extended or adjusted under 35 U.S.C. 154(b) by 860 days.

(21) Appl. No.: 13/177,324

(22) Filed: Jul. 6, 2011

(65) Prior Publication Data

US 2013/0013255 A1    Jan. 10, 2013

(51) Int. Cl.
| | |
|---|---|
| *G05B 23/02* | (2006.01) |
| *G06K 9/62* | (2006.01) |
| *F02K 1/00* | (2006.01) |
| *F01K 13/02* | (2006.01) |
| *G06Q 10/06* | (2012.01) |
| *G05B 13/04* | (2006.01) |

(52) U.S. Cl.
CPC . *F02K 1/00* (2013.01); *F01K 13/02* (2013.01); *G05B 23/0294* (2013.01); *G06K 9/6223* (2013.01); *G06Q 10/06* (2013.01); *G05B 13/041* (2013.01); *G05B 23/0272* (2013.01)

(58) Field of Classification Search
CPC ......... F02K 1/00; F01K 13/02; F02D 41/263; G06K 9/6223; G05B 23/0294; G05B 23/0272; F23N 5/242; F23N 5/24; F23N 2023/44
USPC ....................................................... 702/183
See application file for complete search history.

(56) References Cited

U.S. PATENT DOCUMENTS

| | | | |
|---|---|---|---|
| 5,311,562 A | 5/1994 | Palusamy et al. | |
| 7,398,652 B1 * | 7/2008 | Kosvic et al. | 60/664 |
| 2004/0117148 A1 | 6/2004 | Davies | |
| 2004/0260430 A1 | 12/2004 | Mansingh et al. | |
| 2006/0178762 A1 * | 8/2006 | Wroblewski et al. | 700/30 |
| 2007/0192063 A1 * | 8/2007 | Abu-El-Zeet et al. | 702/182 |
| 2009/0012653 A1 * | 1/2009 | Cheng et al. | 700/287 |
| 2009/0125155 A1 * | 5/2009 | Hill et al. | 700/286 |
| 2010/0152905 A1 * | 6/2010 | Kusiak | 700/276 |
| 2011/0035693 A1 | 2/2011 | Ueno et al. | |
| 2012/0283885 A1 * | 11/2012 | Mannar et al. | 700/286 |

OTHER PUBLICATIONS

A. Kusiak and Z. Song, "Combustion efficiency optimization and virtual testing: A Data Mining Approach," IEEE Trans. Ind. Inf., vol. 2, No. 3, pp. 176-184, Aug. 2006.*

* cited by examiner

*Primary Examiner* — Eliseo Ramos Feliciano
*Assistant Examiner* — Terence Stifter, Jr.
(74) *Attorney, Agent, or Firm* — Jetter & Associates, P.A.

(57) ABSTRACT

A method for obtaining operating parameters of a power plant includes data mining a historical operating condition database for the power plant with a partitional clustering algorithm to generate a statistical model, and calculating dynamic operating condition target values from the statistical model taking into account current operating condition data of the power plant. The method further includes performing a real-time energy-loss analysis based on the dynamic operating condition target values and automatically identifying at least one operating parameter of the power plant from the energy-loss analysis. The partitional clustering algorithm can be a k-means clustering algorithm.

13 Claims, 4 Drawing Sheets

AUTOMATIC IDENTIFICATION OF OPERATING PARAMETERS FOR POWER PLANTS

FIELD

Disclosed embodiments relate to energy production, and more particularly to the operation of power plants.

BACKGROUND

A Condition Monitoring System (CMS) is an automated system for monitoring the parameters of machinery, such as a power plant, so as to predict failures, perform maintenance and adjust performance. A fossil-fuel power plant, for example, may use a CMS to aid an operator in optimizing the performance of the power plant. One of the ways a CMS accomplishes this task is by performing energy loss analysis to determine the causes of energy loss.

An "operating condition" of a power plant refers to a premise upon which the power plant is operating. Air temperature is an example of an operating condition within a power plant. The operating conditions of a power plant with the least equivalent fossil fuel consumption are referred to as "optimal conditions" or "optimal operating conditions." A power plant's optimal conditions may vary according to certain characteristics of the power plant, such as current load, boundary conditions, current fuel characteristics and current circumstances. Energy-loss analysis quantifies and ranks the contribution of key operating parameters to the equivalent fossil fuel consumption deviation, i.e., energy loss. To that end, a CMS may conduct an energy-loss analysis to identify the causes of the power plant's deviation from optimal performance. Based on the causes identified by the CMS, an operator may consequently take corresponding actions to adjust the operating parameters of the power plant, so as to increase the power plant's performance.

One of the key components of an energy-loss analysis is determining what constitutes optimal operating conditions for the power plant. Target values for optimal operating conditions are the inputs for energy-loss analysis, which provides operational guidance. Known methods for calculating target values for power plants include designed target values, overhauled target values and off-design target values. Such known approaches for determining target values for optimal operating conditions, however, operate using only constant or static data and do not take into account current variations in load, fuel characteristics or present circumstances of the power plant. Additionally, the known approaches can be time-consuming and expensive to implement. There is a need for higher-accuracy energy-loss analysis for power plants that accounts for current variations in operating parameters.

SUMMARY

Disclosed embodiments include methods for obtaining operating parameters of a power plant. An example method includes data mining a historical operating condition database for the power plant with a partitional clustering algorithm to generate a statistical model, and calculating dynamic operating condition target values from the statistical model taking into account current operating condition data of the power plant. The method further includes performing a real-time energy-loss analysis based on the dynamic operating condition target values, and automatically identifying at least one operating parameter of the power plant from the energy-loss analysis. The partitional clustering algorithm can comprise a k-means clustering algorithm.

A system for obtaining operating parameters of a power plant comprises a non-transitory machine readable storage for storing historical operating condition data for the power plant and a processor. The processor is configured for data mining a historical operating condition database for the power plant with a partitional clustering algorithm to generate a statistical model, calculating dynamic operating condition target values from the statistical model taking into account current operating condition data of the power plant, performing a real-time energy-loss analysis based on the dynamic operating condition target values, and automatically identifying at least one operating parameter of the power plant from the energy-loss analysis.

DETAILED DESCRIPTION

Figure 1:
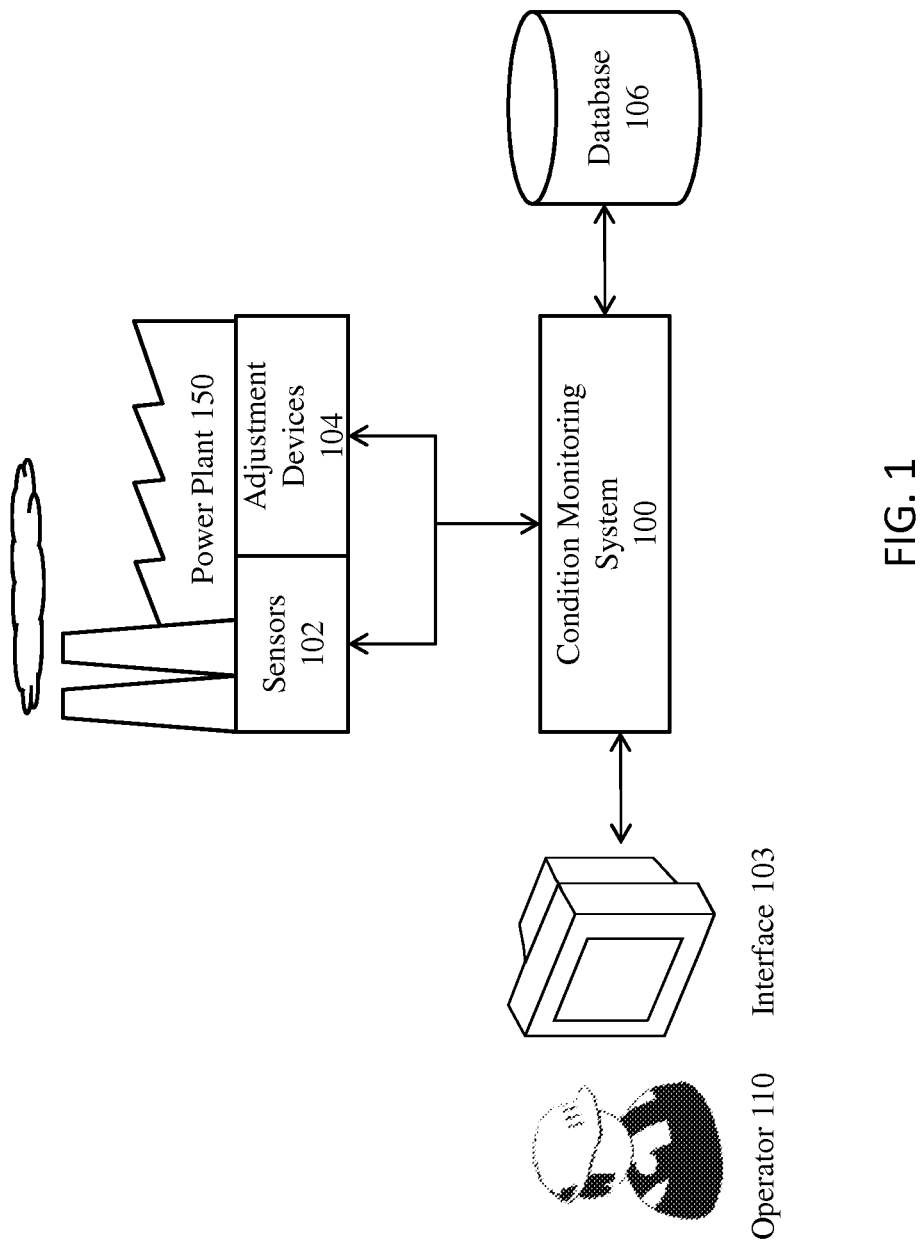
FIG. 1 is an example illustration of a condition monitoring system shown in conjunction with a power plant, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments include a method and system for performing energy-loss analysis calculations in real-time. FIG. 1 is an example illustration of a condition monitoring system (CMS) 100 shown in conjunction with a power plant 102. CMS 100 includes at least one processor 120, such as a digital signal processor. According to an example embodiment, power plant 150 is a fossil fuel power plant, such as a plant that burns coal, natural gas or petroleum (oil) to produce electricity. The CMS 100 receives information about current operating conditions and parameters of the power plant 150 from the sensors 102 that are configured for reporting information about the power plant 150. The data received from the sensors 102, as well as any other data calculated or generated by CMS 100, may be stored in database 106. Data comprises non-transitory machine readable storage. In one disclosed embodiment, operating condition data and operating parameters of the power plant 150 garnered over defined periods of time may be stored in database 106 so as to amass a historical record of the operating condition data and operating parameters of the power plant 150.

In another disclosed embodiment, the database 106 also includes a real-time database wherein current operating condition data, are stored and accessed according to real-time constraints. Current operating condition data is real-time data, i.e., current operating condition data denotes operating condition data that is delivered immediately after collection and wherein there is no delay in the timeliness of the information provided. As described more fully below with reference to the process of FIG. 2, in this embodiment database 106 stores current operating condition data that is garnered from sensors 102 which are used to conduct energy-loss analysis calculations. Historical operating condition data is operating condition data is no longer, real-time data and therefore applies to the past.

The CMS 100 may display the data garnered from the power plant 150 to the operator 110 via an interface 103, which may include a display, a keyboard, mouse, touch screen, a camera, a microphone and speakers. The interface 103 may further allow the operator 110 to control adjustment devices 104, which adjusts various operating parameters of the power plant 150, such as actuators. Operating parameters refer to adjustable properties of the power plant 150. Main steam pressure is an example of an operating parameter of the power plant.

Figure 2:
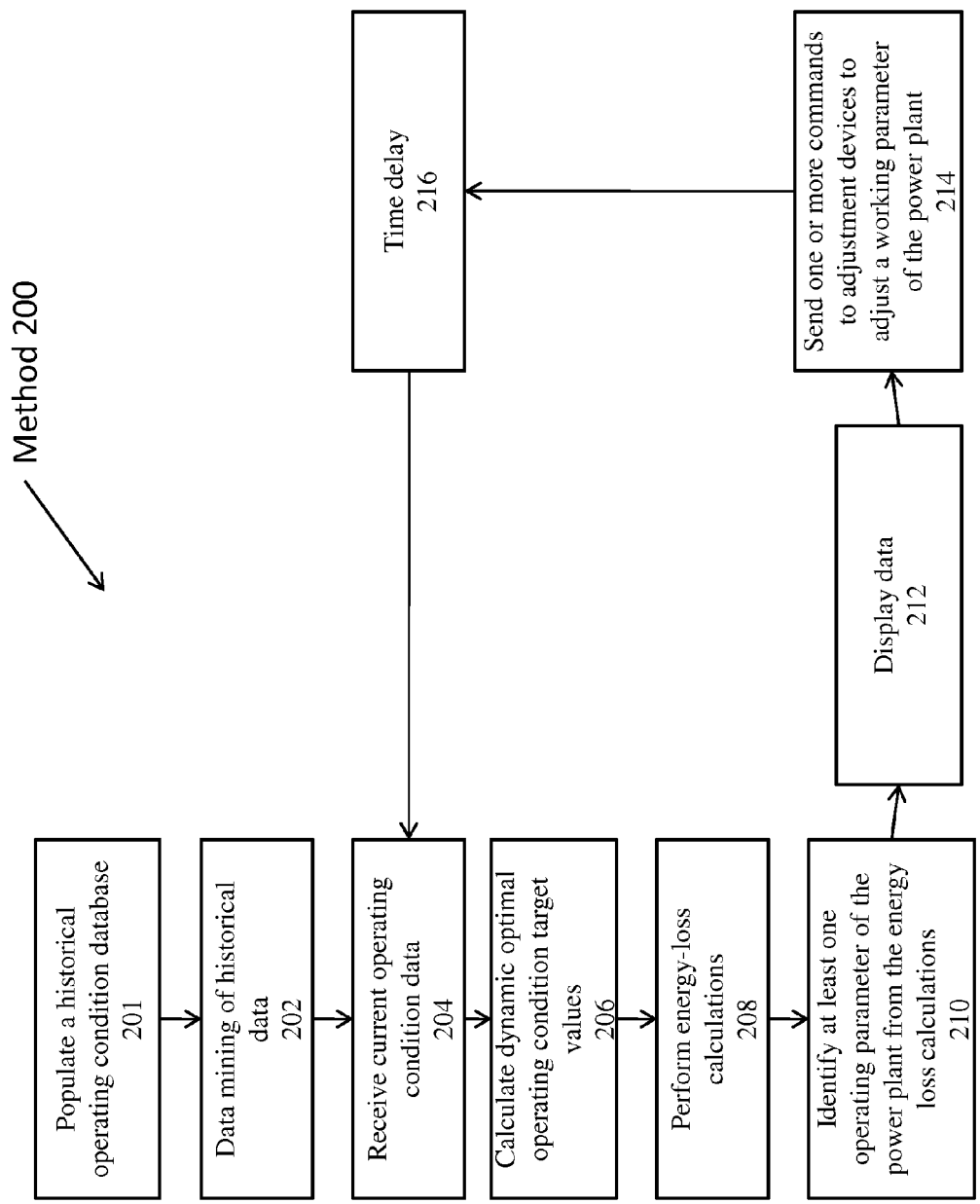
FIG. 2 is flow chart illustrating the control flow for the process of performing energy-loss calculations for a power plant where the data mining comprises k-means clustering according to an example embodiment.

FIG. 2 is flow chart illustrating an example flow for a method 200 for obtaining operating parameters for a power plant 150, including data mining using a k-means clustering, according to an example embodiment. In a first step 201, a database is populated with historical operating condition data pertaining to the power plant 150. In step 202, data mining of the historical data in database 106 is executed using a partitional clustering algorithm, so as to generate a statistical model.

Clustering comprises the assignment of operating conditions in the database into subsets (called clusters) so that observations in the same cluster are similar in some sense. Clustering is a method of unsupervised learning, and is a technique for statistical data analysis. A partitional clustering algorithm calculates all clusters at once. The partitional clustering algorithm can comprise a k-means clustering, a k-means derivative such as fuzzy c-means clustering or a QT clustering algorithm, a locality-sensitive hashing, or graph-theoretic methods, so as to produce a first cluster set.

K-means clustering is a method of cluster analysis which aims to partition n operating conditions, $(x_1, x_2, \ldots, x_n)$, into k sets or clusters ($k \leq n$), $S = \{S_1, S_2, \ldots, S_k\}$, in which each operating condition belongs to the cluster with the nearest mean, as defined in the formula below:

$$\underset{s}{\operatorname{argmin}} \sum_{i=1}^{k} \sum_{x_j \in S_i} \|x_j - \mu_i\|^2$$

wherein $\mu_i$ is the mean of points in $S_i$.

One implementation of the k-means clustering algorithm is executed as follows. Given an initial set of k means $m_1^{(1)}, \ldots, m_k^{(1)}$, which may be specified randomly or by some heuristic, the k-means clustering algorithm proceeds by alternating between the following two steps: 1) an assignment step wherein each operating condition, $(x_1, x_2, \ldots, x_n)$, is assigned to the cluster with the closest mean according to the following formula:

$$S_i^{(t)} = \{x_j : \|x_j - m_i^{(t)}\| \leq \|x_j - m_{i^*}^{(t)}\| \text{ for all } i^* = 1, \ldots, k\}$$

and 2) an update step involving the calculation of the new means to be the centroid of the operating conditions in the cluster, as defined in the following formula:

$$m_i^{(t+1)} = \frac{1}{|S_i^{(t)}|} \sum_{x_j \in S_i^{(t)}} x_j$$

wherein t represents an increment indicator. The two steps above are continually executed until there is no change in an assignment step. The algorithm is deemed to have converged when the assignments no longer change.

Further to step 202, the equation below can be employed to measure the similarity between operation conditions at time i and operating conditions at some other time j:

$$S_{i,j} = -\sqrt{\frac{\sum_{k=1}^{N} w_k (\hat{x}_{ik} - \hat{x}_{jk})^2}{\sum_{k=1}^{N} w_k}}$$

wherein $\hat{x}_{ik}$ and $\hat{x}_{jk}$ are normalized values of the $k^{th}$ operating condition at time i and j, respectively. Further, $w_k$ is a user-defined weighting factor for the $k^{th}$ operating condition. N is the number of operating conditions for a particular class. The equation above is used to calculate the proximity of the same operating condition at a different time. In one embodiment, the equation above is used to implement a rule wherein only those historical operating conditions within a predefined proximity to current operating conditions may be used in the calculation of step 206 below.

In step 204, current operating condition data of the power plant 150 is garnered in real-time from the sensors 102 and is provided to a processor 120 running a disclosed algorithm. In step 206, dynamic optimal operating condition target values for operating parameters of the power plant 150 are calculated in real-time from the statistical model taking into account current operating condition data of the power plant received in step 204.

In one embodiment step 206 comprises executing an update step of the k-means clustering algorithm wherein the current operating condition data is deemed to be the centroid of the operating conditions in the clusters calculated in step 202. Subsequently, the assignment and update steps of the k-means clustering algorithm are continually executed until there is no change in an assignment step. The resulting centroid values of the converged clusters are candidates for optimal operating condition target values for operating parameters of the power plant 150. Then, the candidate operating condition target values calculated above are ranked by importance.

An example method of ranking the order of the candidate operating condition target values comprises bubble sorting. A bubble sort is a simple sorting algorithm that works by repeatedly stepping through a list to be sorted, comparing each pair of adjacent items and swapping them if they are in the wrong order. The pass through the list is repeated until no swaps are needed, which indicates that the list is sorted. In this case, the bubble sort repeatedly steps through the candidate operating condition target values to be sorted, with the goal of ranking the values according to importance. Each pair of values is compared and swapped if they are in the wrong order and the comparisons continue until no swaps are necessary. One measure of importance for an operating condition target value is a thermo-economic indicator, which is related to a condition's affect on energy loss. In the case of a coal-fired power plant, unit coal consumption rate, for example, may be used as the thermo-economic indicator, though other thermo-economic indicators may be used. Therefore, the candidate operating condition target value correspondent to the lowest unit coal consumption rate is the highest ranked target value and is therefore deemed an optimal operating condition target value.

In step 208, energy-loss analysis calculations are performed based on the optimal operating condition target values calculated in step 206. Various methods may be used to identify those operating parameters affecting energy loss. Heat loss due to boiler efficiency, for example, may be analyzed to determine which parameters, such as exhaust gas, air imperfections, fuel imperfections, surface radiation, surface convection and heat refuse, are contributing to heat loss, and therefore energy loss. In another example, the equivalent enthalpy drop method, a partial quantitative analysis method, may be used to identify lossy operating parameters. Additionally, the steam turbine heat rate of the power plant may be analyzed to determine which parameters are contributing to energy loss. The result of step 208 is the identification of operating parameters of the power plant 150 that currently account for energy-loss, according to the energy-loss calculations. A variety of operating parameters of power plant 150 may contribute to energy loss.

With regard to a fossil fuel power plant, the performance of the plant is generally affected by the main initial and final operating parameters, such as main steam pressure, main steam temperature, reheat steam temperature, exhaust steam pressure and the final feed water temperature. Also, operating parameters such as exhaust gas temperature, oxygen percentage in exhaust gas, carbon percentage in fly ash and carbon percentage in slag can affect energy losses in boiler combustion. Further, the following operating parameters pertaining to the thermodynamic cycle in the steam turbine and feedwater regenerative system generally affect energy loss: terminal temperature difference (TTD) of both the high pressure heaters and the low pressure heaters, subcooling of the condensate water and the inlet steam flow rate of auxiliary turbine for boiler feedwater pump, and reheat attemperation flow rate.

In step 210, operating parameters of the power plant 150 that currently account for energy-loss, according to the energy-loss calculations of step 208, are identified. In step 212, the information generated in step 210 is displayed for the operator 110, such as via interface 103. In step 214, the CMS 100, either automatically or in response to receiving instructions from the operator 110 via interface 103, sends one or more commands to adjustment devices 104 to adjust a working parameter of power plant 150, responsive to steps 210 and 212. In step 216, there is a time delay, after which control flows back to step 204, wherein new current operating condition data is received and steps 204-214 are executed once more.

Disclosed embodiments are further illustrated by the following specific examples showing experimental results generated using disclosed methods, which should not be construed as limiting the scope or content of this Disclosure in any way.

Figure 3:
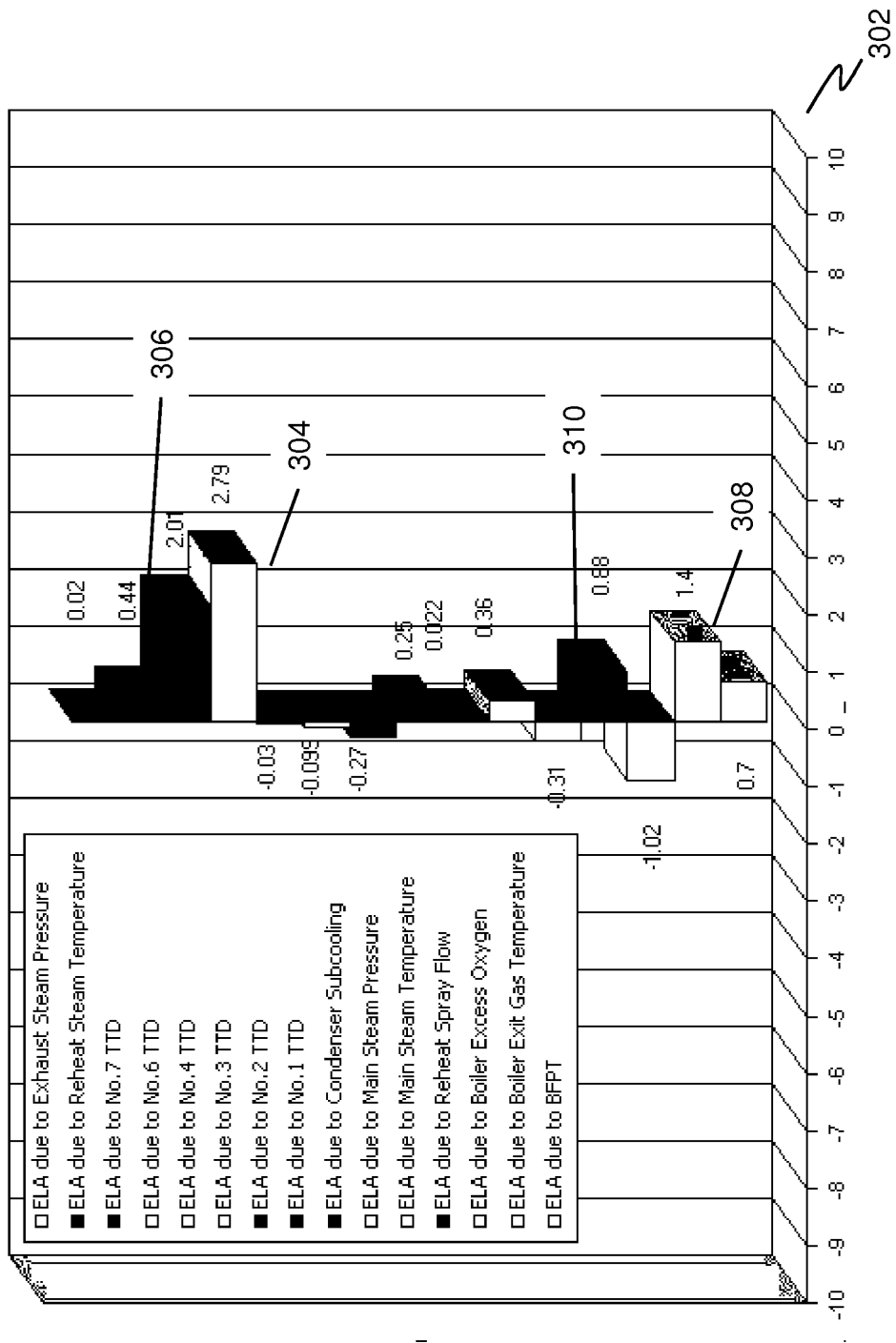
FIG. 3 is a histogram illustrating experimental results gathered according to an example embodiment.

In a first example, shown in FIG. 3, a histogram 302 illustrates experimental results gathered according to an example embodiment implemented at a fossil fuel steam turbine plant. The data of FIG. 3 relates to two units of a fossil fuel steam turbine plant running at full capacity, wherein each unit is a sub-critical turbine unit with 350 MW of power output. The y-axis lists, operating parameters of the power plant, such as exhaust steam pressure and reheat steam temperature. Each operating parameter's contribution to energy loss, as per the energy loss analysis (ELA), is shown on the x-axis of the histogram in standardized units.

FIG. 3 shows that that heater 304 contributes the most to energy loss, potentially because the enthalpy rise setting of the heater is set to a lower value than the optimal setting. FIG. 3 also shows that that heater 306 contributes the second-most to energy loss, potentially because the enthalpy rise setting of the heater is set to a higher value than the optimal setting. Note that a fossil fuel power plant may have multiple heaters that heat various media in different stages of the power-generation process. Consequently, each heater may produce a unique result when performing energy loss analysis. Contributing third and fourth-most are the boiler excess oxygen 308 and reheat spray flow 310 parameters, potentially because the parameters are set to a higher value than the optimal setting. The histogram of FIG. 3 can be displayed for an operator, such as operator 110, who can use this data to manipulate adjustment devices 104 so as to adjust those operating parameters of the power plant that need adjusting the most. The above scenario would lead to operation of the power plant at a higher efficiency rate. Experimental data calculations show that operating the power plant at a higher efficiency rate may lead to substantial cost savings.

Figure 4:
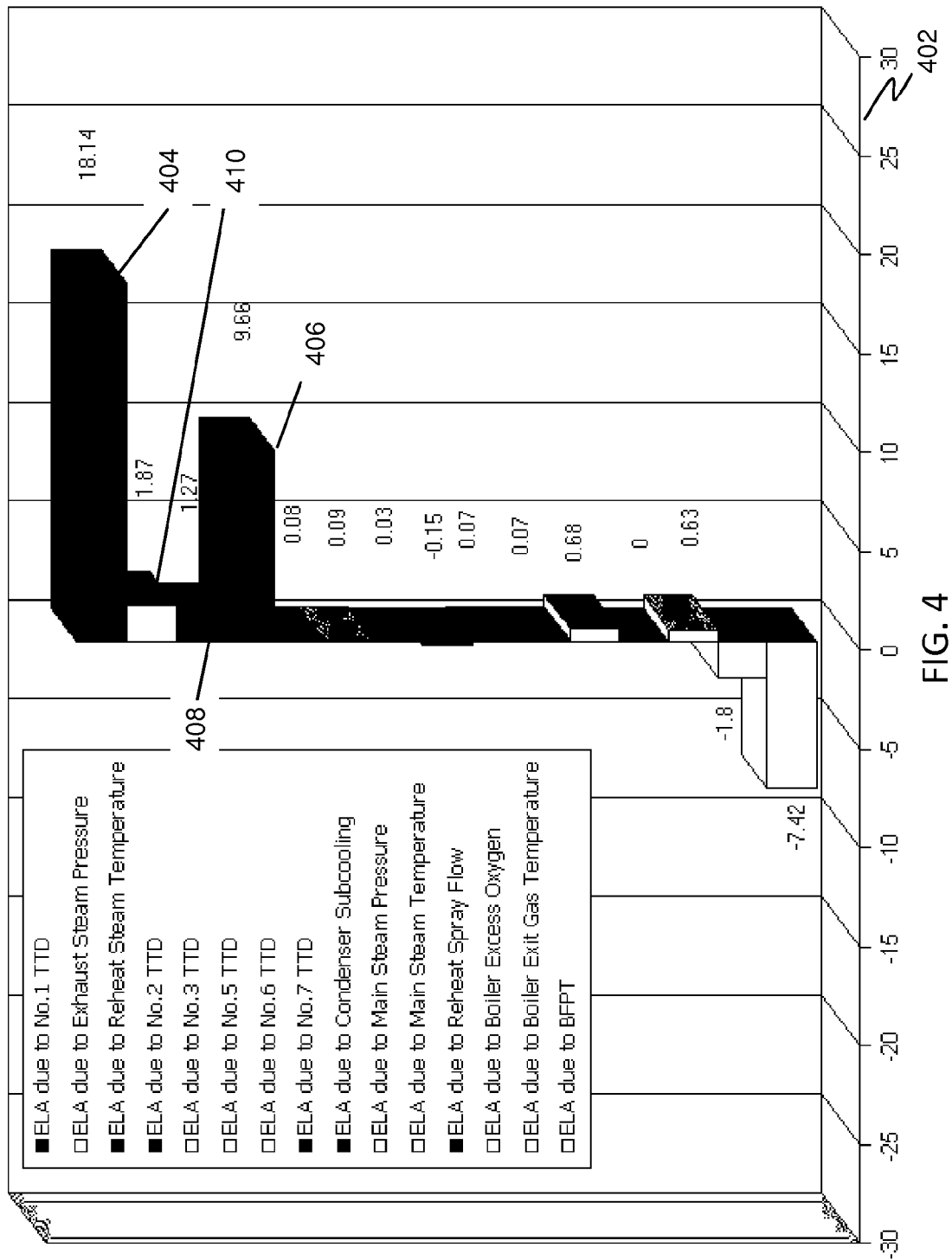
FIG. 4 is a histogram illustrating a second set of experimental results gathered according to an example embodiment.

In a second example, shown in FIG. 4, a histogram 402 illustrates experimental results gathered according to an example embodiment implemented at a fossil fuel steam turbine plant. The data of FIG. 4 relates to two units of a fossil fuel steam turbine plant running at full capacity, wherein each unit is a super-critical turbine unit with 600 MW of power output.

FIG. 4 shows that that heater 404 contributes the most to energy loss, potentially because the enthalpy rise setting of the heater is set to a higher value than the optimal setting. FIG. 4 also shows that that heater 406 contributes the second-most to energy loss, potentially because the enthalpy rise setting of the heater is set to a lower value than the optimal setting. Contributing third and fourth-most are the exhaust steam pressure 408 and reheat steam pressure 410 parameters, because the parameters are not set to optimal settings. Again, the histogram of FIG. 4 can be displayed for an operator, who can use this data to manipulate adjustment devices 104 so as to operate the power plant at a higher efficiency rate. Experimental data calculations show that operating the aforementioned power plant at a higher efficiency rate may lead to a substantial savings.

The experimental data of FIG. 3 and FIG. 4 above show the ability of the disclosed methods to provide energy loss analysis that is specific and customized to different types of power plants. This results in an energy loss analysis method that is versatile and portable for use with varied types of power plants and fuels.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system."Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

Computer program code for carrying out operations of the disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The Disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a physical computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

We claim:

1. A method for operating of a power plant, comprising:
   providing a processor implementing an operating parameter determination algorithm stored in a non-transitory memory accessible by said processor, said algorithm including:
      data mining a historical operating condition database for the power plant with a first partitional clustering algorithm to generate a statistical model;
      calculating dynamic operating condition target values from the statistical model taking into account current operating condition data of the power plant by performing a second partitional clustering algorithm which comprises a k-means clustering algorithm upon the statistical model and the current operating condition data and sorting said operating condition target values resulting from the k-means clustering algorithm using a bubble sort algorithm;
      performing a real-time energy-loss analysis based on the dynamic operating condition target values;
      automatically identifying a plurality of operating parameters of the power plant from the energy-loss analysis, and
   manipulating a first operating parameter selected from the plurality of operating parameters using an adjustment device in the power plant during operation of the power plant.

2. The method of claim 1, wherein the current operating condition data is provided by sensors in said power plant as real-time data to said processor.

3. The method of claim 2, wherein the power plant comprises a fossil fuel power plant or coal fired power plant.

4. The method of claim 1, wherein the first partitional clustering algorithm comprises a k-means clustering algorithm.

5. The method of claim 1, wherein the step of performing a real-time energy-loss analysis further comprises:
   analyzing boiler efficiency based on the dynamic operating condition target values.

6. The method of claim 1, wherein the step of performing a real-time energy-loss analysis further comprises:
   using an equivalent enthalpy drop method based on the dynamic operating condition target values.

7. The method of claim 1, wherein the step of performing the real-time energy-loss analysis further comprises:
   analyzing a steam turbine heat rate based on the dynamic operating condition target values.

8. The method of claim 1, wherein the plurality of operating parameters include at least one of: main steam pressure, main steam temperature, reheat steam temperature, exhaust steam pressure, final feed water temperature, exhaust gas temperature, oxygen percentage in exhaust gas, carbon percentage in fly ash, carbon percentage in slag, terminal temperature difference (TTD) of high pressure heaters, TTD of low pressure heaters, subcooling of condensate water, inlet steam flow rate of auxiliary turbine for boiler feedwater pump, and reheat attemperation flow rate.

9. A system for operating a power plant, comprising:
- a non-transitory memory for storing historical operating condition data for the power plant and an operating parameter determination algorithm;
- a processor coupled to access said operating parameter determination algorithm and for implementing the operating parameter determination algorithm, said algorithm including:
  - data mining a historical operating condition database for the power plant with a partitional clustering algorithm to generate a statistical model;
  - calculating dynamic operating condition target values from the statistical model taking into account current operating condition data of the power plant by performing a second partitional clustering algorithm which comprises a k-means clustering algorithm upon the statistical model and the current operating condition data, and sorting said operating condition target values resulting from the k-means clustering algorithm using a bubble sort algorithm;
  - performing a real-time energy-loss analysis based on the dynamic operating condition target values, and
  - automatically identifying a plurality of operating parameters of the power plant from the energy-loss analysis, and
- adjustment devices coupled within the power plant for adjusting respective ones of the plurality of operating parameters.

10. The system of claim 9, further comprising:
an interface for displaying the at least one operating parameter of the power plant.

11. The system of claim 9, further comprising:
one or more sensors communicably coupled with the power plant, wherein said one or more sensors garner and transmit the current operating condition data as real-time data to said processor.

12. The system of claim 11, wherein the processor is further configured for receiving data associated with the power plant from the one or more sensors and calculating the current operating condition data of the power plant based on the data that was received.

13. The system of claim 9, wherein the processor is further configured for sending commands to the adjustment devices to adjust the plurality of operating parameters.

* * * * *